(12) United States Patent
Yang

(10) Patent No.: US 12,704,948 B2
(45) Date of Patent: Aug. 11, 2026

(54) CONTENT DISPLAY METHOD AND APPARATUS AND ELECTRONIC DEVICE

(71) Applicant: VIVO MOBILE COMMUNICATION CO., LTD., Dongguan (CN)

(72) Inventor: Hanqiu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 206 days.

(21) Appl. No.: 18/619,976

(22) Filed: Mar. 28, 2024

(65) Prior Publication Data

US 2024/0241625 A1 Jul. 18, 2024

Related U.S. Application Data

(63) Continuation of application No. PCT/CN2022/121751, filed on Sep. 27, 2022.

(30) Foreign Application Priority Data

Sep. 30, 2021 (CN) .......................... 202111161296.1

(51) Int. Cl.
*G06F 3/0484* (2022.01)
*G06F 3/14* (2006.01)

(52) U.S. Cl.
CPC .......... *G06F 3/0484* (2013.01); *G06F 3/1407* (2013.01)

(58) Field of Classification Search
CPC .... G06F 3/0484; G06F 3/1407; G06F 1/1641; G06F 1/1652; G06F 3/0481; G06F 2203/04803
See application file for complete search history.

(56) References Cited

U.S. PATENT DOCUMENTS

| | | | | |
|---|---|---|---|---|
| 2014/0101535 A1* | 4/2014 | Kim | G06F 3/04886 715/761 |
| 2014/0281948 A1 | 9/2014 | Sei et al. | |
| 2021/0247805 A1* | 8/2021 | Min | G06F 9/4843 |
| 2021/0365165 A1* | 11/2021 | Chen | G06F 3/0488 |
| 2023/0044497 A1 | 2/2023 | Zhang et al. | |
| 2023/0236720 A1* | 7/2023 | Opara | G06F 3/04886 715/769 |

FOREIGN PATENT DOCUMENTS

| | | |
|---|---|---|
| CN | 108762640 A | 11/2018 |
| CN | 109460200 A | 3/2019 |
| CN | 109947315 A | 6/2019 |
| CN | 110677712 A | 1/2020 |
| CN | 110716686 A | 1/2020 |
| CN | 111263005 A | 6/2020 |
| CN | 111408145 A | 7/2020 |

(Continued)

*Primary Examiner* — Cao H Nguyen
(74) *Attorney, Agent, or Firm* — The Webb Law Firm

(57) ABSTRACT

A content display method includes receiving a first input by a user in a case of displaying a content in a first object; and in response to the first input, displaying M contents in M regions of the screen of an electronic device. The M regions correspond to the M contents one-to-one, M is an integer greater than 1, each of the M contents includes at least one of the first content in the first object or at least one type of additional information associated with the first content in the first object; and at least part of content in different regions is different.

20 Claims, 9 Drawing Sheets

An electronic device receives a first input by a user in a case of displaying a content in a first object — 101

In response to the first input, the electronic device displays M contents in M areas on the screen of the electronic device — 102

(56) References Cited

FOREIGN PATENT DOCUMENTS

| | | | |
|---|---|---|---|
| CN | 111601141 | A | 8/2020 |
| CN | 111885408 | A | 11/2020 |
| CN | 112231030 | A | 1/2021 |
| CN | 112269519 | A | 1/2021 |
| CN | 112764639 | A | 5/2021 |
| CN | 113867607 | A | 12/2021 |
| CN | 115065874 | A | 9/2022 |

* cited by examiner

Crease
(a)
(b)
(c)

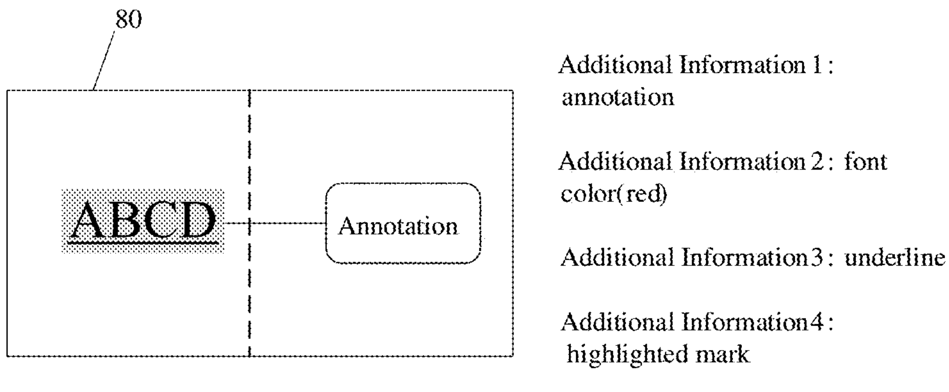
FIG. 7A
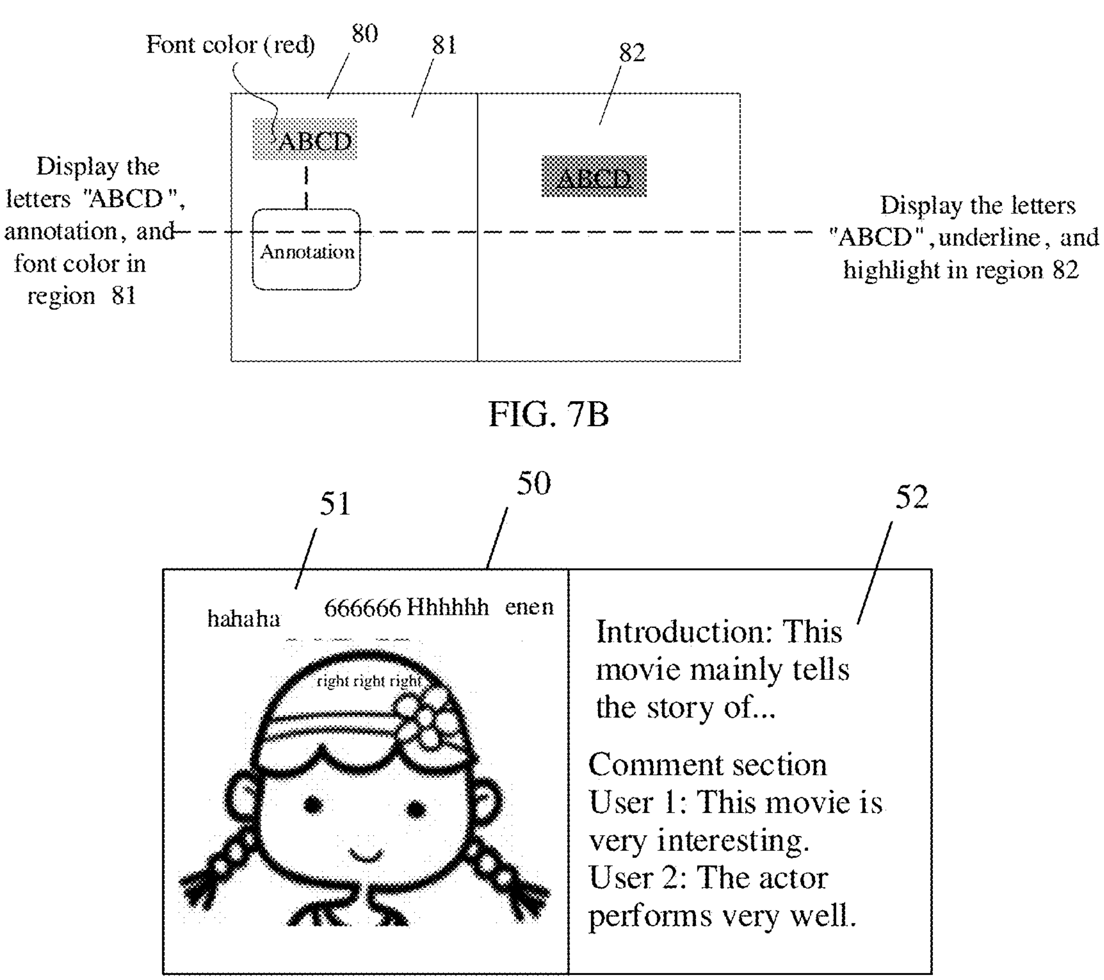
FIG. 7B
FIG. 8

CONTENT DISPLAY METHOD AND APPARATUS AND ELECTRONIC DEVICE

CROSS-REFERENCE TO RELATED APPLICATIONS

This application is a Bypass Continuation Application of International Patent Application No. PCT/CN2022/121751, filed Sep. 27, 2022, and claims priority to Chinese Patent Application No. 202111161296.1, filed Sep. 30, 2021, the disclosures of which are hereby incorporated by reference in their entireties.

BACKGROUND OF THE INVENTION

Field of the Invention

The present application belongs to the field of electronic devices, and relates to a content display method and apparatus and an electronic device.

Description of Related Art

With the development of electronic devices, functions of electronic devices are becoming more and more diverse. For example, users can browse content through electronic devices, such as content in video files and content in documents.

SUMMARY OF THE INVENTION

The embodiments of the present application provide a content display method and apparatus and an electronic device.

According to a first aspect, embodiments of the present application provide a content display method, including: receiving a first input by a user in a case of displaying content in a first object; and in response to the first input, displaying M contents in M regions of the screen of an electronic device, where the M regions correspond to the M contents one-to-one, M is an integer greater than 1, each of the M contents includes at least one of the following: first content in the first object or at least one type of additional information associated with the first content in the first object; and at least part of content in different regions is different.

According to a second aspect, embodiments of the present application provide a content display apparatus, including a receiving module and a display module. The receiving module is configured to receive a first input by a user when the display module displays content in a first object; and the display module is configured to: in response to the first input received by the receiving module, display M contents in M regions of the screen of an electronic device, where the M regions correspond to the M contents one-to-one, M is an integer greater than 1, each of the M contents includes at least one of the following: first content in the first object or at least one type of additional information associated with the first content in the first object; and at least part of content in different regions is different.

According to a third aspect, embodiments of the present application provide an electronic device, including a processor, a memory, and a program or an instruction stored in the memory and executable on the processor, and when the program or the instruction is executed by the processor, steps of the content display method according to the first aspect are implemented.

According to a fourth aspect, the embodiments of this application provide a non-transitory readable storage medium. The non-transitory readable storage medium stores a program or an instruction, and when the program or the instruction is executed by a processor, steps of the content display method according to the first aspect are implemented.

According to a fifth aspect, the embodiments of the present application provide a chip, where the chip includes a processor and a communications interface, the communications interface is coupled to the processor, and the processor is configured to run a program or an instruction, to implement the content display method according to the first aspect.

BRIEF DESCRIPTION OF THE DRAWINGS

FIG. 7A is a ninth schematic diagram of an interface of a content display method provided by an embodiment of the present application;

FIG. 7B is a tenth schematic diagram of an interface of a content display method provided by an embodiment of the present application;

FIG. 8 is an eleventh schematic diagram of an interface of a content display method provided by an embodiment of the present application;

DESCRIPTION OF THE INVENTION

Figure 1:
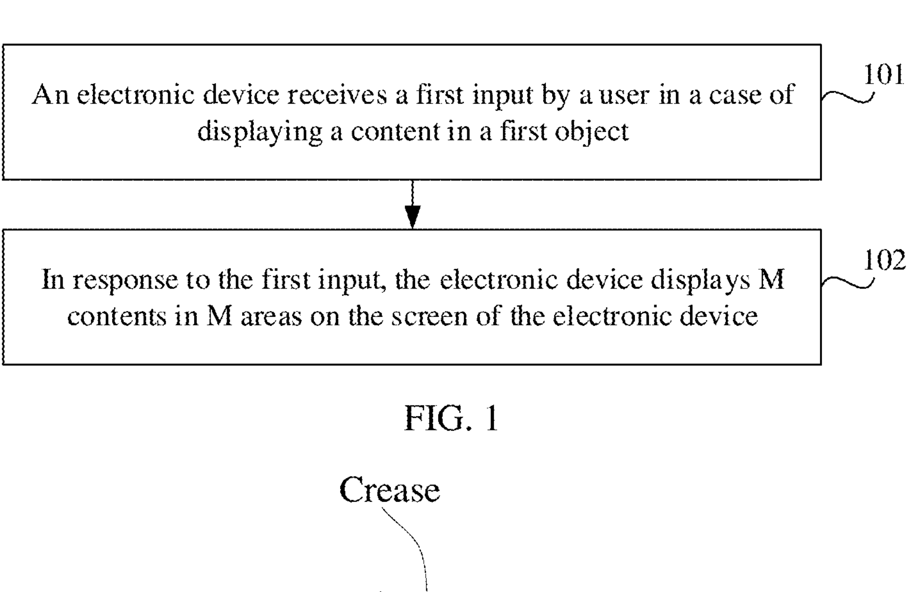
FIG. 1 is a flowchart of a content display method provided by an embodiment of the present application.

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the data used in such a way is interchangeable in proper circumstances so that the embodiments of this application can be implemented in an order other than the order illustrated or described herein. In addition, in this specification and the claims, "and/or" represents at least one of connected objects, and a character "/" generally represents an "or" relationship between associated objects.

For example, a user browses content in a word document through an electronic device. When the user browses the content (such as a text, a table or an image) in the word document through the electronic device, if the content is marked in different manners, for example, there are annotation, underline, or highlighted marks on the content, to indicate different reading focus through different marks. However, when multiple marks overlap, some of the multiple marks may be blocked by other marks. For example, the annotation can obscure the highlighted mark, making it impossible for users to see the highlighted mark. As a result, the electronic device has less flexibility in displaying content.

It should be noted that the identifiers in the embodiments of this application are used to indicate text, symbols, images, etc. of information, and controls or other containers may be used as carriers for displaying information, and the identifiers include but are not limited to text identifiers, symbol identifiers, and image identifiers.

The content display method and apparatus and electronic device provided by the embodiments of the present application will be described below through some embodiments and application scenarios with reference to the accompanying drawings.

The content display method provided by the embodiment of the present application can be applied to the scenario of browsing content in files such as documents or video files through electronic devices.

For example, when the content in object A (that is, the first object in this embodiment of the present application) is displayed through an electronic device, the user can input to the electronic device (that is, the first input in this embodiment of this application) to trigger the electronic device to display M contents in M regions, where the M regions correspond to M contents one-to-one, at least part of content in different regions is different, M is an integer greater than 1; and each of the M contents may include at least one of the following: first content in object A or at least one type of additional information associated with the first content in object A. In this way, the user can input to the electronic device to trigger the electronic device to display different contents in object A in different regions. For example, the first content in object A and at least part of additional information associated with the first content in object A are displayed in different regions, or the additional information associated with the first content in object A is displayed in different regions, which can improve the flexibility of the electronic device in displaying the content.

With reference to FIG. 1, an embodiment of the present application provides a content display method, which may include the following steps 101 and 102. The following is an exemplary description taking the electronic device executing the method as an example.

Step 101: An electronic device receives a first input by a user in a case of displaying content in a first object.

Optionally, in this embodiment of the present application, the first object may be a video file or document.

Optionally, in the embodiment of this application, when the first object is a video file, the content in the first object may include: video pictures, or video pictures and bullet comments. The details may be determined according to actual usage requirements. The embodiments of this application constitute no limitation. It can be understood that in this embodiment of the present application, the video picture is the first content in the video file, that is, the main content.

Optionally, in this embodiment of the present application, when the first object is a document, the content in the first object may include: the main text (that is, the first content described below) of the document and at least part of the additional information of the first content. The main text of the document can include: characters (such as text, letters, or numbers), tables, images, or the like.

Optionally, in this embodiment of the application, the document may include: word documents, Excel documents, PPT documents, or the like.

Optionally, in the embodiment of the present application, the electronic device may be an electronic device with a foldable screen (for example, a scroll screen or a folding screen), or may be an electronic device with a solid-state screen. The details may be determined according to actual usage requirements. The embodiments of this application constitute no limitation.

Optionally, in the embodiment of the present application, the first input may be touch input, floating input, preset gesture input or voice input, which may be determined according to actual usage requirements.

For example, when the electronic device is an electronic device with a foldable screen, the first input may be a folding input of the user on the screen along a first preset folding direction (it may be one folding input or multiple folding inputs). When the electronic device is an electronic device with a solid screen, the first input may be a sliding input of the user on the screen (it may be one sliding input or multiple sliding inputs). When the electronic device is an electronic device with a foldable screen or a solid screen, the first input may be an input of the user on a "split screen" button or control.

Optionally, in the embodiment of the present application, the first preset folding direction may be a direction of folding outward (that is, folding toward the back of the electronic device) or may be a direction of folding inward (that is, folding toward the screen of the electronic device).

Step 102: In response to the first input, the electronic device displays M contents in M regions on the screen of the electronic device.

In this embodiment of the present application, the M regions correspond to the M contents one-to-one, and at least part of the content in different regions is different, and M may be an integer greater than 1.

Optionally, in this embodiment of the present application, each of the M contents includes at least one of the following: first content in the first object or at least one type of additional information associated with the first content in the first object.

Optionally, in this embodiment of the present application, when the first object is a video file, the additional information associated with the first content in the first object may include at least one of the following categories: an introduction to the video, a directory of the video, comment information corresponding to the video, or video bullet comments. The details can be determined according to actual usage requirements, and are not limited in the embodiments of this application.

Optionally, in this embodiment of the present application, when the first object is a document, the additional information associated with the first content in the first object may include at least one of the following categories: the underline corresponding to the first content, the color corresponding to the first content, highlight mark corresponding to the first content, or the annotation corresponding to the first content. The details can be determined according to actual usage requirements, and are not limited in the embodiments of this application.

Optionally, in the embodiment of the present application, different types of additional information are displayed in different regions, or one type of additional information can be displayed in multiple regions. The details can be determined according to actual usage requirements, and are not limited in the embodiment of the present application.

Optionally, in this embodiment of the present application, before receiving the first input by the user, the electronic device may display additional information associated with the first content in the first object, or may hide additional information associated with the first content in the first object.

Optionally, in this embodiment of the present application, before the electronic device displays M contents in M regions of the screen of the electronic device, the content display method provided by the embodiment of the present application may also include: in response to the first input, dividing, by the electronic device, the screen of the electronic device into the M regions corresponding to the first input.

Figure 2:
FIG. 2 is a first schematic diagram of an interface of a content display method provided by an embodiment of the present application.
Figure 3:
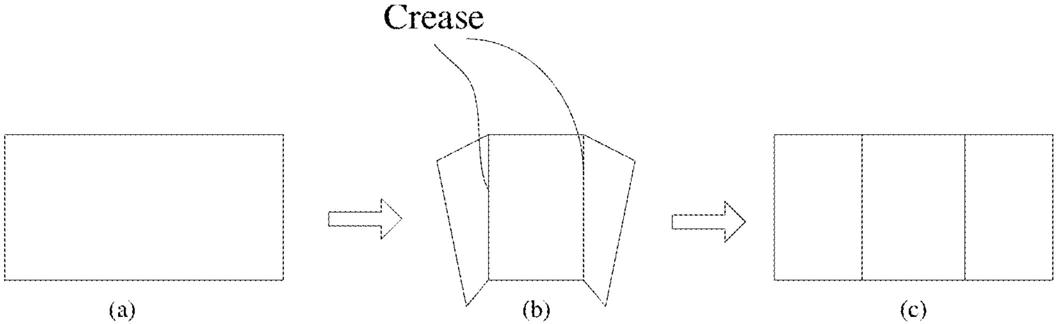
FIG. 3 is a second schematic diagram of an interface of a content display method provided by an embodiment of the present application.

For example: when the electronic device is an electronic device with a foldable screen, for example, the screen 20 of the electronic device as shown in (a) in FIG. 2, after the user folds the screen 20 inward (that is, the first input) along the crease shown in (b) in FIG. 2, the electronic device can divide the screen 20 into 2 regions shown in (c) in FIG. 2 (that is, M=2). For example, on the screen 20 of the electronic device is shown in (a) in FIG. 3, after the user folds the screen 30 inward (that is, the first input) along two creases shown in (b) in FIG. 3, the electronic device can divide the screen 20 into 3 regions shown in (c) in FIG. 3 (that is, M=3).

For the convenience of description, in the following embodiments, unless otherwise specified, the content display method provided by the embodiments of the present application is exemplarily described by taking the electronic device as an electronic device with a foldable screen. An electronic device with a solid-state screen is the same. To avoid repetition, details will not be described here.

The content display method provided by the embodiment of the present application is exemplarily described below with reference to FIG. 4A and FIG. 4B.

Figure 4A:
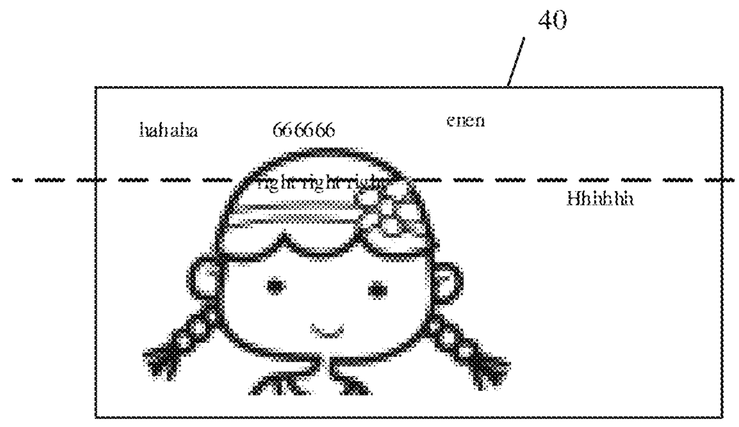
FIG. 4A is a third schematic diagram of an interface of a content display method provided by an embodiment of the present application.
Figure 4B:
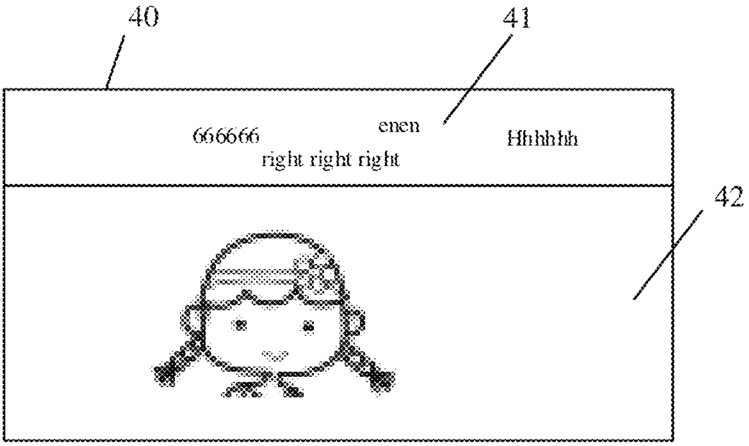
FIG. 4B is a fourth schematic diagram of an interface of a content display method provided by an embodiment of the present application.

In example 1, as shown in FIG. 4A, the electronic device displays the video frame (that is, the first content) and the bullet comments of video file 1 on the screen 40. If the user folds the screen 40 inward along the dotted line shown in FIG. 4A (that is, the first input), as shown in FIG. 4B, the electronic device can divide the screen into a region 41 and a region 42, and display the video bullet comments (that is, at least one type of additional information of the first content) in the region 41, and display the video picture (that is, the first content) in region 42, that is, M contents are displayed in M regions. In this way, since the electronic device can display the video picture and the bullet comments in the video file in separate regions, the bullet comments will not block the video picture, thereby improving the user's viewing experience of the video picture.

Optionally, compared with the solution in the existing technology in which the electronic device needs to first display the bullet comment control after the user triggers, and then close the bullet comments after the user clicks the bullet comment control; the electronic device in example 1 allows the user to fold the screen, so that the video screen and the bullet comments can be displayed in separate regions. This on the one hand can prevent the bullet comments from affecting the display effect of the video screen, and on the other hand, the user can view the video screen and the bullet comments at the same time, thus improving the user experience.

The above example 1 is an example of displaying, in different regions, the content displayed on the screen of the electronic device. In actual implementation, as shown in the following example 2, the electronic device can also display, in the M regions, the content initially displayed on the screen and hidden content (such as the directory and introduction corresponding to the video).

Figure 5A:
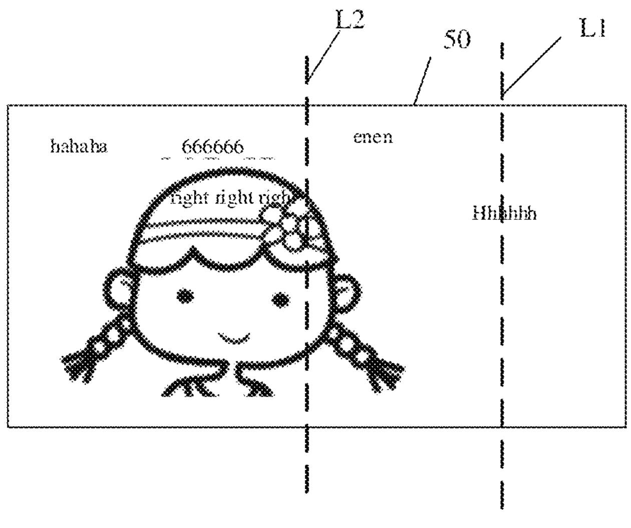
FIG. 5A is a fifth schematic diagram of an interface of a content display method provided by an embodiment of the present application.
Figure 5B:
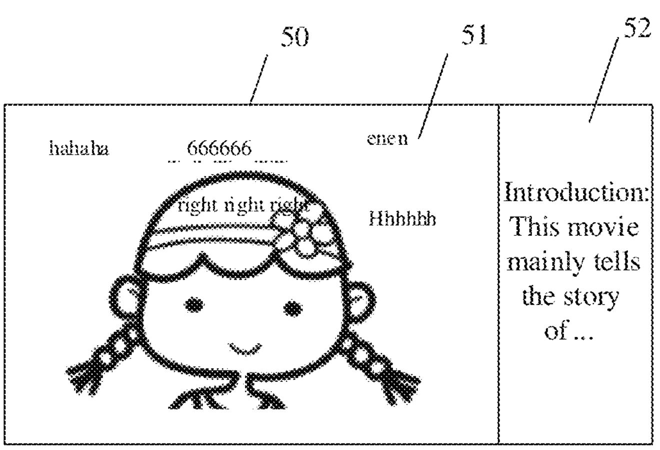
FIG. 5B is a sixth schematic diagram of an interface of a content display method provided by an embodiment of the present application.

In example 2, as shown in FIG. 5A, the electronic device displays the video frame (that is, the first content) and the bullet comments of video file 1 on the screen 50. If the user folds the screen inward along the dotted line L1 shown in FIG. 5A (that is, the first input), as shown in FIG. 5B, the electronic device can divide the screen into a region 51 and a region 52 (that is, M regions), and display the video picture and the video bullet comments in the region 51, and display the video introduction (that is, the hidden content) in region 52. In this way, while watching the video screen, the user can view the corresponding introduction of the video screen to increase the understanding of the video file, thereby improving the flexibility of the electronic device to display content.

Optionally, compared with the existing technology in which the electronic device needs to first exit the full-screen video display under the trigger of the user, and then display the introduction when the user clicks on the introduction control; the electronic device in example 2 allows the user to fold the screen, so that the hidden introduction content and video picture can be displayed in different regions, which can simplify user operations.

Optionally, in this embodiment of the present application, when the first object is a video file, if the folding position of the first input is parallel to the first side of the screen, the electronic device can display, in separate regions, the content (the first content and additional information associated with the first content) displayed on the screen. If the folding position of the first input is parallel to the second side of the screen, the electronic device can display the content already displayed on the screen and the target additional information in separate regions, and the target additional information is additional information in the first object that is associated with the first content and is in a hidden state.

The first side and the second side are perpendicular, and when the screen faces the user, the angle between the first side and the line connecting the user's eyes is smaller than the angle between the second side and the line connecting the user's eyes.

Figure 6A:
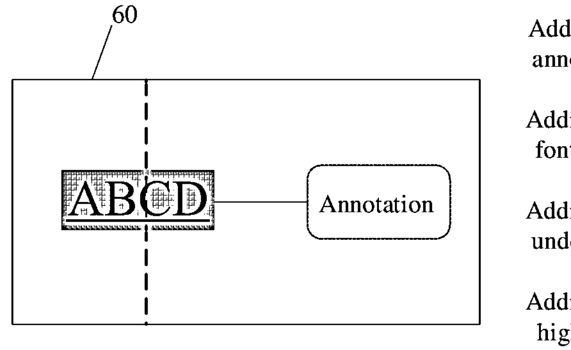
FIG. 6A is a seventh schematic diagram of an interface of a content display method provided by an embodiment of the present application.
Figure 6B:
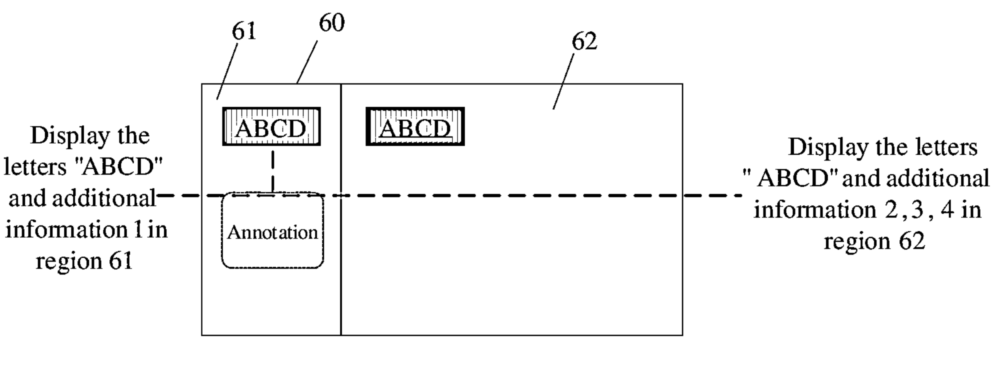
FIG. 6B is an eighth schematic diagram of an interface of a content display method provided by an embodiment of the present application.

In example 3, when the first object is a document, different types of additional information are different reading focus for readers. When the document includes multiple types of additional information associated with the first content, different types of additional information may be displayed in an overlapping manner, causing certain/certain types of additional information to be blocked or covered, thus affecting user reading. As shown in FIG. 6A, the electronic device displays the letters "ABCD" of the document (that is, the first content) on the screen 60, and displays four types of additional information associated with the letters "ABCD", which are additional information 1 (annotation), additional information 2 (font color is red), additional information 3 (underline), and additional information 4 (highlighted mark). The highlighted mark is blocked/covered by the annotation. In this case, if the user folds the screen 60 inward along the dotted line shown in FIG. 6A (that is, the first input), as shown in FIG. 6B, the electronic device can divide the screen 60 into a region 61 and a region 62, region 61 displays letters "ABCD" and additional information 1, and region 62 displays letters "ABCD", additional information 2, additional information 3, and additional information 4, that is, M contents are displayed in M regions. In this way, by displaying the additional information associated with the letters "ABCD" in different regions, it is convenient for the user to view different focus in the document.

Optionally, since the annotation and the highlighted mark can be displayed in separate regions, the annotation can be prevented from blocking the highlighted mark.

Optionally, in this embodiment of the present application, the M contents include first content and N types of additional information, and N is a positive integer. The step 102 can be implemented through the following step 102*a*.

Step 102*a*: In response to the first input, the electronic device sequentially displays the M contents in the M regions according to a first priority order of the first content and the N types of additional information.

Optionally, in this embodiment of the present application, the electronic device may set the first content to have the highest priority, or may set the first content to have the lowest priority, which is determined based on requirements.

Optionally, in this embodiment of the present application, the first priority order of the first content and N types of additional information may be pre-saved by the electronic device, or may be determined in real time based on the user's current operation, which is specifically determined based on needs.

Optionally, in the embodiment of the present application, the first priority order may be an ascending order of priorities or a descending order of priorities. The specific order may be determined according to actual usage requirements, which is not limited in the embodiment of the present application.

Optionally, in this embodiment of the present application, the electronic device may sequentially display M contents in M regions according to the target parameter and the first priority order. The target parameter includes at least one of the following: a size ratio of the M regions, or a first preset arrangement order of the M regions.

The first preset arrangement order may be an arrangement order from top to bottom, from bottom to top, from left to right, from right to left, increasing size or decreasing size, which can be determined according to actual usage requirements. The embodiments of this application constitute no limitation.

For example, the electronic device may sequentially display the M contents in the M regions based on the principle of displaying content of the M contents with a higher priority in a larger region among the M regions, or may sequentially display the M contents in the M regions based on the principle of displaying content of with a lower priority in the first priority order in a larger region among the M regions, which is specifically determined according to the needs.

A description of how the electronic device can sequentially display M contents in M regions according to the target parameter and the first priority order will be described in the following embodiments, and will not be described here in order to avoid repetition.

In this embodiment of the present application, the electronic device can sequentially display M contents in M regions according to the first priority order of the first content and N types of additional information. This can improve the flexibility of content display on the electronic device.

In the content display method provided by the embodiment of the present application, when the content in the first object is displayed, the user can trigger, through the first input, the electronic device to display different contents in the first object in different regions. For example, the first content and at least part of additional information associated with the first content in the first object are displayed in different regions, or the additional information associated with the first content in the first object is displayed in different regions, which can improve the flexibility of the electronic device in displaying the content.

Taking the first object as a video file and a document as an example, the content display method provided by the embodiment of the present application will be described below.

Optionally, the first object is a document.

Optionally, in this embodiment of the present application, when the first object is a document, before step 101, the embodiment of the present application may also include the following step 103. The step 102*a* may be performed through the following step A.

Step 103: The electronic device displays the first content and N types of additional information on the screen.

In the embodiment of the present application, when the first object is a document, before receiving the first input, the first content of the first object and the N types of additional information related to the first content have been displayed on the screen.

It can be understood that in this embodiment of the present application, the N types of additional information may be all or part of the types of additional information associated with the first content in the first object.

Step A: The electronic device splits the first content and the N types of additional information into the M contents according to the first priority order and M first size ratios, and sequentially displays the M contents in the M regions.

Each of M first size ratios is a ratio of a size of one of the M regions to a size of the screen, and each of the M contents includes the first content, or each of the M contents includes the first content and at least one of the N types of additional information. Optionally, in this embodiment of the present application, when different types of additional information are displayed in different regions, N is an integer greater than or equal to M.

It should be noted that when the first object is a document, since the additional information associated with the first content exists dependent on the first content, for each of the M contents, if the content includes one or more of the N types of additional information, the content also includes the first content. That is, each of the M regions includes the first content.

Optionally, in this embodiment of the present application, when the first object is a document, since the additional information exists depending on the first content, the first priority order of the first content and N types of additional information may be the priority order of the N types of additional information, that is, the priority of the first content is not considered.

In order to more clearly explain the content display method provided by the embodiment of the present application, the following is an exemplary description of the first priority order of the first content and N types of additional information.

Optionally, this embodiment of the present application provides exemplary description of splitting, by the electronic device, the first content and the N types of additional information into the M contents according to the first priority order and M first size ratios, and sequentially displaying the M contents in the M regions.

For example, it is assumed that different types of additional information are displayed in different regions, and it is assumed that M regions are arranged in a first preset order, the first content and N types of additional information are arranged in a first preset priority. For the convenience of description, in the following embodiments, the first content and N types of additional information arranged according to the first preset priority are called N+1 contents arranged according to the first priority order.

The $i^{th}$ (i is a positive integer) region among M regions is hereafter called region i, if $$s_i \leq a_i * \left(\frac{S}{N+1}\right)$$

and $a_i$, is a positive integer greater than 1, region i includes the $(h+1)^{th}$ content to the $(h+a_i)^{th}$ content of the above N+1 contents; if $$s_i \leq a_i * \left(\frac{S}{N+1}\right)$$

and $a_i$ is less than or equal to 1 and greater than or equal to the first preset value (determined based on actual usage requirements), region i includes the $(h+1)^{th}$ content among the above N+1 contents; and the first content is included in each region.

$s_i$ is the size of region i, S is the screen size of the electronic device, and h is the number of contents in the first i−1 regions.

For example, assume that the document includes 4 types (that is, N is 4) of additional information associated with the letters "ABCD" (that is, the first content), and the first content and the 4 types of additional information are arranged in descending order of priority (that is, the first priority order) as: additional information 1 (annotation), additional information 2 (font color is red), additional information 3 (underline), additional information 4 (highlighted mark), and the letters "ABCD". Then, combined with the above example 3, the electronic device displays the first content and the four types of additional information on the screen, and after the user folds the screen 60 inward along the dotted line shown in FIG. 6A (that is, the first input), as shown in FIG. 6B, the electronic device can divide screen 60 into two regions, namely region 61 and region 62 arranged in order from left to right (that is, the first preset arrangement order). The area of region 61 is al, the total screen area is S, and al=S/4. Therefore, the electronic device can display the letters "ABCD" and annotation (that is, additional information 1) in region 1, and display the letters "ABCD" and additional information 2 (font color is red), additional Information 3 (underline), and additional Information 4 (highlight) in region 2.

For another example, assume that the document includes 4 types of additional information associated with the letters "ABCD". These 4 types of additional information are arranged in descending order of priority (that is, the first priority order): additional information 1 (annotation), additional information 2 (font color is red), additional information 3 (underline), and additional information 4 (highlighted mark). Then, as shown in FIG. 7A, the electronic device displays the letters "ABCD" (that is, the first content), and displays four types of additional information associated with the letters "ABCD" on the screen 80. The four types of additional information are additional information 1 (annotation), additional information 2 (font color is red), additional information 3 (underline), and additional information 4 (highlight mark). The highlight mark is blocked/covered by the annotation. In this case, if the user folds the screen 80 inward along the dotted line shown in FIG. 7A (that is, the first input), as shown in FIG. 7B, the electronic device can divide the screen 80 into two regions arranged in order from left to right (that is, the first preset arrangement order), namely region 81 and region 82. The area of region 81 is al, the total screen area is S, and al=S/2. Therefore, the electronic device can display the letter "ABCD" annotation (that is, additional information 1) and additional information 2 (the font color is red) in region 1, and display the letters "ABCD", additional information 3 (underline) and additional information 4 (highlight) in region 2.

Optionally, in this embodiment of the present application, the electronic device can use the largest region among the M regions as the main display region, and use other regions as auxiliary display regions, that is, the M regions include one main display region and M−1 auxiliary display regions. It can be understood that the main display region is considered to be the region frequently browsed by the user. The electronic device may display low-priority content in the auxiliary display region and display high-priority content in the main display region according to the first priority order and the first size ratio of the M regions.

For example, assuming that the number of auxiliary display regions is one, the electronic device can display additional information with the lowest priority among the N types of additional information and the first content in the auxiliary display region, and display the remaining N−1 types of additional information and the first content in the main display region.

For another example, assuming that the number of auxiliary display regions is one, the electronic device can display additional information with the highest priority among the N types of additional information and the first content in the main display region, and display the remaining N−1 types of additional information and the first content in the auxiliary display region.

Optionally, in this embodiment of the present application, the size of each auxiliary display region is greater than or equal to a target preset value.

Optionally, in this embodiment of the present application, if at least two regions among the M regions have the same size, the electronic device may use the region that satisfies the preset condition among the at least two regions as the main display region.

For example, according to the user's daily operating habits, if the uses often uses the right hand to operate the screen in daily life, the region near the rightmost side of the screen among the at least two regions will be used as the main display region, and vice versa.

For other descriptions in step A, refer to the relevant descriptions in the above embodiments. To avoid repetition, they will not be described again here.

In the embodiment of the present application, when the first object is a document, the electronic device can split the first content and the N types of additional information into M contents according to the first priority order corresponding to the N types of additional information and the size ratio of the M regions, and sequentially display the M contents in the M regions, that is, different additional information in the document can be displayed in separate regions, thus improving the flexibility of the electronic device to display the content. Optionally, by displaying the additional information in different regions, it is easier for users to view different focus in the document.

Optionally, the first object is a video file.

Optionally, in this embodiment of the present application, when the first object is a video file, before the above step 101, the embodiment of the present application may further include the following step 104. The above step 102*a* can be implemented through the following steps B to D.

Step 104: The electronic device displays second content on the screen, where the second content includes the first content, or the first content and first type of additional information.

Optionally, in this embodiment of the present application, the first type of additional information may be at least one of the video bullet comments, the video introduction, the comment information corresponding to the video, or the video directory.

Step B: The electronic device determines M−1 first target regions from M regions.

Optionally, in this embodiment of the present application, the M−1 first target regions may be the last M−1 regions among the M regions arranged in a second preset arrangement order. The second preset arrangement order may be an arrangement order from top to bottom, from bottom to top, from left to right, from right to left, increasing size or decreasing size, which can be determined according to actual usage requirements. The embodiments of this application constitute no limitation.

For example, the M−1 first target regions may be regions among the M regions other than a region for displaying video pictures.

Step C: The electronic device determines, based on M−1 second size ratios, the N types of additional information from the P types of additional information arranged in priority order.

Each of the M−1 second size ratios is a ratio of the size of a first target region to the size of the screen, and P may be an integer greater than or equal to N.

Optionally, in this embodiment of the present application, the N types of additional information may include the first type of additional information, or may not include the first type of additional information, which may be determined based on the first input.

Optionally, in this embodiment of the present application, the first type of additional information is video bullet comments.

Optionally, in this embodiment of the present application, the electronic device arranges the P types of additional information in the ascending order of priority, or may arrange the P types of additional information in the descending order of priority.

Optionally, in this embodiment of the present application, the priority order of P types of additional information can be set in advance. Since the priority order of the P types of additional information is set in advance, the priority order of the N types of additional information determined from the P types of additional information is also preset.

Optionally, in the embodiment of this application, in method 1, the P types of additional information may include: video bullet comments, video introduction, comment information corresponding to the video, and video directory, that is, include all the additional information associated with the first content. Method 2: The P types of additional information include the bullet comments of the video; or the P types of additional information include the introduction of the video, the comment information corresponding to the video, and the directory of the video.

For example, in the above-mentioned method 1, it can be preset that the P types of additional information are arranged in descending order of priority: the video bullet comments, the video introduction, comment information corresponding to the video, and the video directory.

For another example, in the above method 2, when the P types of additional information include the video introduction, the comment information corresponding to the video, and the directory of the video, it can be preset that the P types of additional information are arranged in descending order of priority: introduction of the video, comment information corresponding to the video, and the directory of the video.

Step C is exemplarily explained below.

For example, assume that the M−1 first target regions are arranged in the second preset arrangement order, and the P type additional information is arranged in the priority order.

For the $j^{th}$ (j is a positive integer) first target region among the M−1 first target regions, hereafter called region j, if $$s_j \leq a_j * \left(\frac{S}{p}\right)$$

and $a_j$ is a positive integer, the $(u+1)^{th}$ type of additional information to $(u+a_j)^{th}$ type of additional information in the above P types of additional information are determined. If $$s_j \leq a_j * \left(\frac{S}{p}\right)$$

and $a_j$ is greater than or equal to the second preset value, and $a_j$ is less than or equal to 1, the $(u+1)^{th}$ additional information in the P types of additional information can be determined; where $s_j$ is the size of region j, S is the screen size, and u is the number of types of additional information determined from the P types of additional information in the first j−1 regions among the M−1 first target regions.

It can be understood that in this embodiment of the present application, the above-mentioned N types of additional information include all additional information determined in the M−1 first target regions.

Step D. The electronic device splits the first content and N types of additional information into M contents according to M−1 second size ratios, a third size ratio, and the first priority order, and sequentially displays the M contents in M regions.

The third size ratio is the ratio of the size of the second target region to the size of the screen, and the second target region is the region other than the M−1 target regions among the M regions.

Optionally, in this embodiment of the present application, when the above N types of additional information do not include the first type of additional information, the electronic device displays the first type of additional information in the region where the first content is located, for example, video bullet comments (that is, the first type of additional information) are superimposed on the first content.

For other descriptions in step D, refer to the relevant description of the above-mentioned step A. To avoid repetition, they will not be described again here.

Optionally, in this embodiment of the present application, when the first object is a video file, since the additional information associated with the first content can exist independently, only one of the M regions mentioned above may include the first content. For other regions among the M regions, at least one type of additional information related to at least the first content may be included in each region.

Steps B to D are exemplarily described below with reference to some examples.

For example, assume that the first object is a video file, the video file includes 3 types of additional information (that is, P is 3) associated with the video picture (that is, the first content), and the video picture and the 3 types of additional information are arranged in the ascending order of priorities as: video screen, video introduction, video comments, and video directory. As shown in FIG. 5A, the electronic device displays the video screen of video file 1 (that is, the first content) and bullet comments (that is, the first type of additional information) on the screen. Then, 1) if the user folds the screen inward along the dotted line L1 shown in FIG. 5A (that is, the first input), as shown in FIG. 5B, the electronic device can divide the screen into 2 regions, and the 2 regions are arranged in order from left to right as (that is, the second preset arrangement order): region 51 and region 52. The size of region 51 is larger than the size of region 52. Therefore, the electronic device can determine the first target region as region 52. Since the size of region 52 al=screen size/4, that is, 1 type of additional information can be displayed in region 52. Therefore, the electronic device can determine the introduction of the video in the 3 types of additional information (that is, the N types of additional information is the introduction of the video). Then, the electronic device can display the video picture with the highest priority in the largest region 51, display the introduction of the video in region 52, and keep display of the bullet comments on the video picture.

2) if the user folds the screen inward along the dotted line L2 shown in FIG. 5A (that is, the first input), as shown in FIG. 8, the electronic device can divide the screen into 2 regions, and the 2 regions are arranged in order from left to right as (that is, the second preset arrangement order): region 51 and region 52. The size of region 51 is larger than the size of region 52. Therefore, the electronic device can determine the first target region as region 52. Since the size of region 52 al=screen size/2, that is, 2 types of additional information can be displayed in region 52. Therefore, the electronic device can determine the introduction of the video and comments of the video in the 3 types of additional information (that is, the N types of additional information includes the introduction of the video and comments of the video). Then, the electronic device can display the video picture with the highest priority in the largest region 51 and display the video introduction and video comment information in region 52. Optionally, the electronic device can keep display of the bullet comments on the video screen.

For other descriptions in steps B to D, refer to the relevant descriptions in the above embodiments. To avoid repetition, they will not be described again here.

In the embodiment of the present application, the electronic device can first determine the N types of additional information from all the P types of additional information related to the first content, and according to the first priority order of the first content and the N-type additional information, sequentially display M contents in the M regions, that is, the video picture and at least part of the additional information associated with the video picture in the video file can be displayed in different regions, so that the flexibility of the electronic device in displaying the content can be improved.

Optionally, in this embodiment of the present application, after the above step 102, the content display method provided by the embodiment of the present application may further include the following steps 105 and 106.

Step 105: The electronic device receives a second input performed by the user on a first region among the M regions.

Optionally, in this embodiment of the present application, the number of regions in the first region may be one.

Optionally, in the embodiment of the present application, for the relevant description of the second input, refer to the relevant description of the first input in the above embodiment. In order to avoid duplication, the details will not be described again here.

Step 106: In response to the second input, the electronic device splits content in the first region into at least two first sub-contents according to a priority of the content in the first region, divides the first region into at least two first sub-regions, and displays one of the first sub-contents in each of the first sub-regions.

Each first sub-content includes at least one of the following: the first content, or at least one type of additional information associated with the first content.

Optionally, in the embodiment of the present application, the additional information included in the at least one type of additional information in step 106 may be the same as or different from the additional information included in the at least one type of additional information in the above-mentioned step 102, which is not limited in the embodiment of the present application.

In this embodiment of the present application, the number of the at least two first sub-contents is the same as the number of the at least two first sub-regions, and different first sub-contents of the at least two first sub-regions are displayed in different first sub-regions.

It should be noted that in this embodiment of the present application, the content in the first region can be split. That the content in a region can be split can be understood as:

when the first object is a document, the region includes the first content and at least one type of additional information associated with the first content; when the first object is a video file, the region includes: the first content and at least one type of additional information associated with the first content; or includes at least two types of additional information associated with the first content.

It can be understood that in the embodiment of the present application, if the size of the first region is smaller than the minimum size that allows splitting (such as the above-mentioned first preset value/second preset value), or the content in the first region cannot be further split, the electronic device can display a prompt message to remind the user that the split cannot be continued.

For other descriptions of steps 105 and 106, refer to the relevant descriptions of the above-mentioned steps 101 and 102. To avoid repetition, they will not be described again here.

The content display method provided by the embodiment of the present application is exemplarily described below with reference to the accompanying drawings.

Figure 11:
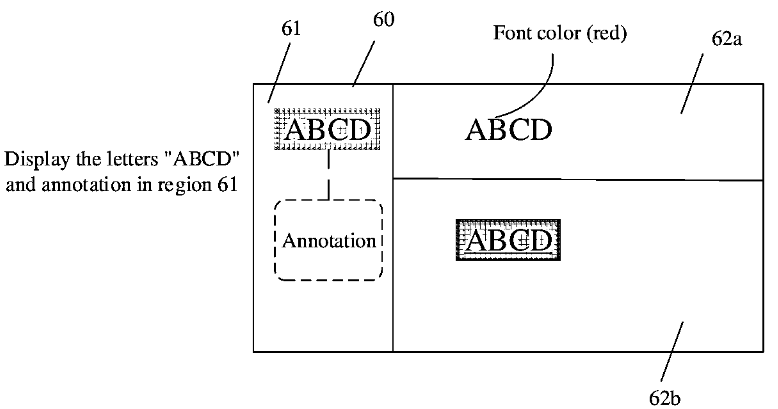
FIG. 11 is a sixteenth schematic diagram of an interface of a content display method provided by an embodiment of the present application.

Exemplarily, as shown in FIG. 6B, the electronic device divides the screen 60 into two regions, namely region 61 and region 62, and displays the letters "ABCD" and annotation in the region 61, and the letters "ABCD", font color (red), underline and highlight mark in the region 62. If the user folds the screen 60 inward along the dotted line shown in FIG. 6B, because the size of the region 61 cannot be split, as shown in FIG. 11, the electronic device can only split the region 62 into a sub-region 62*a* and a sub-region 62*b*, and superimpose and display the letters "ABCD" and the font color (red) in the sub-region 62*a*, and display the letters "ABCD", underline, and highlight are shown in the sub-region 62*b*.

Figure 9A:
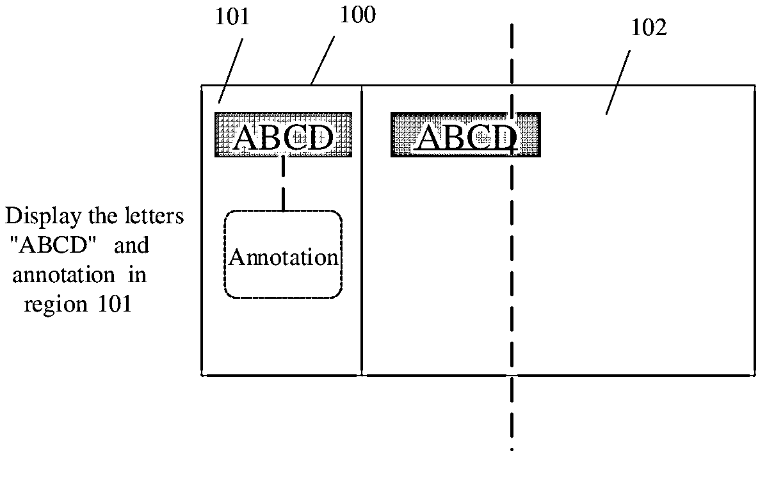
FIG. 9A is a twelfth schematic diagram of an interface of a content display method provided by an embodiment of the present application.
Figure 9B:
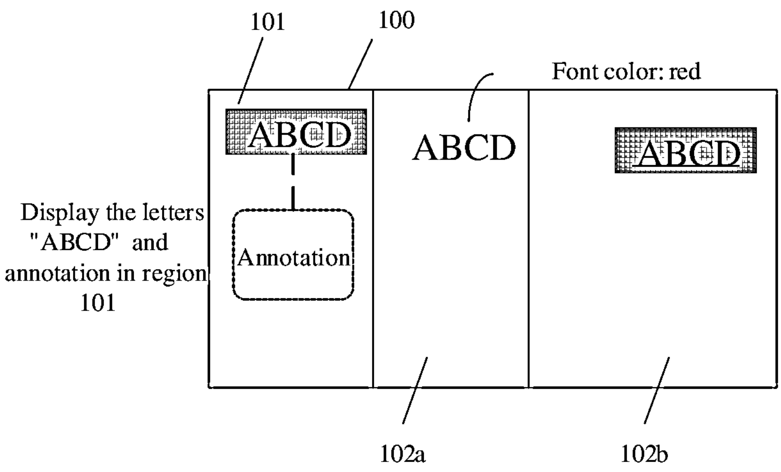
FIG. 9B is a thirteenth schematic diagram of an interface of a content display method provided by an embodiment of the present application.

As another example, the first object is a document. As shown in FIG. 9A, the electronic device divides the screen 100 into a region 101 and a region 102, and displays the letters "ABCD" and additional information 1 (annotation) in the region 101, displays the letters "ABCD", additional information 2 (font color is red), additional information 3 (underline), and additional information 4 (highlighted mark) in region 102. In this case, if the user folds the screen 100 inward along dotted line shown in FIG. 9A (that is, the second input), as shown in FIG. 9B, the electronic device can divide the region 102 into a sub-region 102*a* and a sub-region 102*b*. The region 102*a* displays the letters "ABCD" and the font color, and the region 102*b* displays the letters "ABCD", underline, and highlight in a superimposed manner.

In this embodiment of the present application, since the electronic device can subdivide the first region and the content in the first region in response to the user's second input, so that the flexibility of the electronic device in displaying content can be improved.

Optionally, in the embodiment of the present application, after the above step 102, the embodiment of the present application may further include the following steps 107 to 110.

Step 107: The electronic device receives a third input performed by the user on multiple regions among the M regions.

Optionally, in the embodiment of the present application, for the relevant description of the third input, refer to the relevant description of the first input in the above embodiment. In order to avoid duplication, the details will not be described again here.

Optionally, in this embodiment of the present application, the third input may be an input for multiple regions.

Step 108: The electronic device displays prompt information in response to the third input.

The prompt information may include multiple region identifiers, and each region identifier is used to indicate at least one region among the multiple regions. For example, assuming there are two regions, namely region 1 and region 2, the electronic device can display three region identifiers indicating: region 1; region 2; and region 1 and region 2.

Step 109: The electronic device receives a fourth input performed by the user on a target region identifier among the multiple region identifiers.

The target region identifier may be used to indicate the second region.

Step 110: In response to the fourth input, the electronic device splits content in the second region into at least two second sub-contents according to a priority of the content in the second region, divides the second region into at least two second sub-regions, and displays one of the second sub-contents in each of the second sub-regions.

Each second sub-content includes at least one of the following: the first content, or at least one type of additional information associated with the first content.

Optionally, in the embodiment of the present application, the additional information included in the at least one type of additional information in step 110 may be the same as or different from the additional information included in the at least one type of additional information in the above-mentioned step 102, which is not limited in the embodiment of the present application.

For other descriptions of step 107 and step 110, refer to the relevant descriptions in the above embodiments. To avoid repetition, they will not be described again here.

The content display method provided by the embodiment of the present application is exemplarily described below with reference to the accompanying drawings.

Figure 10A:
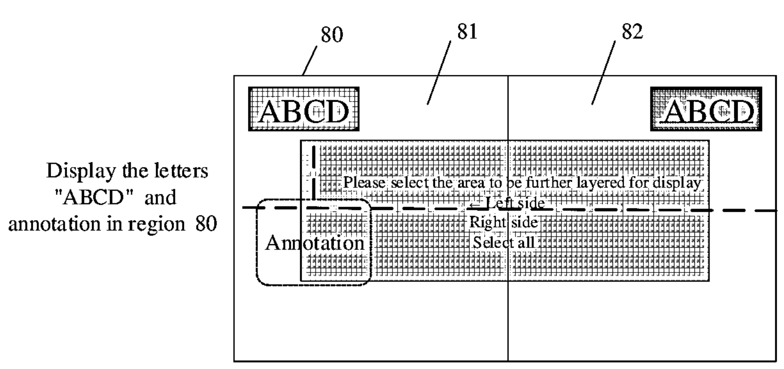
FIG. 10A is a fourteenth schematic diagram of an interface of a content display method provided by an embodiment of the present application.
Figure 10B:
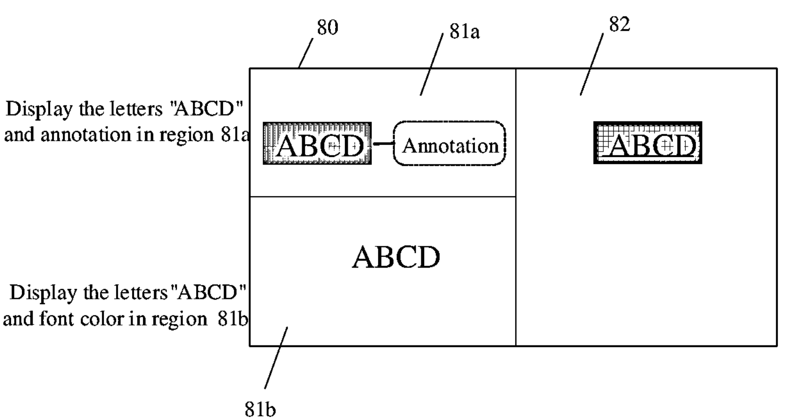
FIG. 10B is a fifteenth schematic diagram of an interface of a content display method provided by an embodiment of the present application.

Illustratively, taking the first object as a document, as shown in FIG. 7B, the electronic device can divide the screen 80 into two regions, namely region 81 and region 82, and display letters "ABCD" annotation in region 1 (that is, additional information 1) and additional information 2 (font color is red), and display the letters "ABCD", additional information 3 (underline) and additional information 4 (highlight) in region 2. In this case, if the user folds the screen 80 inward along the dotted line shown in FIG. 7B (that is, the third input), if the crease of the third input divides the region 81 into two separable sub-regions, and divide the region 82 into two detachable sub-regions, as shown in FIG. 10A, the electronic device can display a prompt information. The prompt information includes: the "left" mark indicating the region 81, the "right" mark indicating region 82, and the select-all mark indicating regions 81 and 82. If the user selects the "left" mark (that is, the fourth input), as shown in FIG. 10B, the electronic device can split region 81 into a sub-region 81*a* and a sub-region 81*b*. Then, the electronic device can display the letters "ABCD" and annotation in the sub-region 81*a*, superimpose and display the letters "ABCD" and the font color in the region 81*b*, and maintain the content in the region 82 constant.

In the embodiment of the present application, when the user folds multiple regions among the M regions, because the electronic device can display prompt information including multiple region identifiers, and each region identifier indicates at least one region among the multiple regions, by inputting a target region identifier among multiple region identifiers, the user can trigger the electronic device to split and display the region that meets the user's splitting requirements and the content in the region, which can improve human-computer interaction performance.

Optionally, in this embodiment of the present application, assuming that the M regions include a third region and a fourth region, and the number of types of additional information included in the third region is greater than the number of types of additional information included in the fourth region, for example, assuming that the third region includes two types of additional information and the fourth region includes one type of additional information, after the above step 102, the content display method provided by the embodiment of the present application may also include the following steps 111 and 112.

Step 111: The electronic device receives a fifth input of the user.

Optionally, in the embodiment of the present application, for the relevant description of the fifth input, refer to the relevant description of the first input in the above embodiment. In order to avoid duplication, the details will not be described again here.

Step 112: In response to the fifth input, when feature information of the fifth input matches feature information of the first input (the two are the same, or the matching degree of the two is greater than or equal to the preset threshold), the electronic device displays, in the fourth region, part of the additional information in the third region, and cancels the display of part of the additional information in the third region.

Optionally, in this embodiment of the present application, part of the additional information in the third region may be one or more types of additional information in the third region.

Optionally, in this embodiment of the present application, the priority of each additional information in the third region may be greater or lower than the priority of each additional information in the fourth region.

Optionally, in this embodiment of the present application, the third region and the fourth region may be adjacent regions.

Optionally, in this embodiment of the present application, the user can trigger, through multiple fifth inputs, the electronic device to display, in the fourth region, different parts of the additional information in the third region for multiple times and cancel the display of these parts of the additional information in the third region.

Optionally, in the embodiment of the present application, the number of the third regions and the fourth regions is not limited. For example, the third region may be one region and the fourth region may also be one region, or the third region may be two regions and the fourth region is 1 region, or the third region is 1 region and the fourth region is 2 regions, which can be determined according to the fifth input.

Optionally, in this embodiment of the present application, the input feature information may include at least one of the following: input corresponding position or input direction.

In the embodiment of the present application, matching the feature information of the fifth input with the feature information of the first input can be understood as: the input position corresponding to the fifth input is the same as the input position corresponding to the first input, and the input direction of the fifth input is the same as the input direction of the first input.

In the embodiment of the present application, in actual implementation, that the input position corresponding to the fifth input is the same as the input position corresponding to the first input means that the two are the same within a certain error range, and that the input direction of the fifth input is the same as that of the first input means that the two are the same within a certain error range.

For example, the region boundary line formed by the input position of the first input is expressed by the formula $y=d1*x+e1$, and the region boundary line formed by the input position of the fifth input is expressed by the formula $y=d2x+e2$. Then, if the absolute value of the difference between d1 and d2 is within a preset error range, and the absolute value of the difference between e1 and e2 is within another preset error range, the electronic device can confirm that the input position corresponding to the fifth input is the same as the input position corresponding to the first input.

The content display method provided by the embodiment of the present application is exemplarily described below with reference to the accompanying drawings.

For example, assuming that the first input is an input of the user to fold the screen of the electronic device inward, and the folding position corresponding to the first input is the first position, after the electronic device responds to the user's first input, as shown in FIG. 6B, the electronic device can divide the screen 60 into two regions, namely region 61 and region 62, and display the letters "ABCD" and annotation in region 1, and display the letters "ABCD", font color (red), underline and highlight mark in region 2. In this case, if the user folds the screen inward again, and the folding position is the first position (that is, the fifth input), the electronic device can move the font color (red) in region 62 to region 61 for display according to the priority order of the additional information in region 62 (for description, refer to the above description and details will not be repeated here), and keep the display sizes of region 61 and region 62 unchanged.

In the embodiment of the present application, when feature information of the fifth input of the user matches feature information of the first input, because the electronic device can only display, in another region, part of the additional information in one region, without dividing the regions, and cancel the display of this part of the additional information in one of the regions, thereby improving the flexibility of the electronic device in displaying content.

Optionally, in this embodiment of the present application, after the above step 102, the content display method provided by the embodiment of the present application may further include the following steps 113 and 114.

Step 113: The electronic device receives a sixth input of the user.

Optionally, in the embodiment of the present application, for the relevant description of the sixth input, refer to the relevant description of the first input in the above embodiment. In order to avoid duplication, the details will not be described again here.

Step 114: In response to the sixth input, in a case that an input position of the sixth input matches an input position of the first input and an input direction of the sixth input is different from an input direction of the first input, the electronic device displays the content in the first object in a display manner used before receiving the first input.

In the embodiment of the present application, in actual implementation, matching the input position corresponding to the sixth input and the input position corresponding to the first input means that the two are the same within a certain error range. Refer to corresponding description that the input position corresponding to the fifth input is the same as the input position corresponding to the first input in the above-mentioned step 110, and details will not be repeated here to avoid repetition.

Optionally, in the embodiment of the present application, that the input direction of the sixth input is different from the input direction of the first input can be understood as that the input direction of the sixth input is opposite to the input direction of the first input. In actual implementation, the input direction of the sixth input is not necessarily completely opposite to the input direction of the first input, and a certain error is allowed.

For example: if the first input is the user's input to fold the screen, and the first input is to fold inward by 30°, the folding direction of the first input is the inward direction. If the sixth input is the input to fold outward by 5°, the folding direction of the fifth input should be the outward direction. If the first input is the user's sliding input on the screen, and the first input is the input of sliding upward on the screen, the input direction of the first input is the upward direction. If the sixth input is the input of sliding downward on the screen, the input direction of the sixth input is the downward direction.

In the embodiment of the present application, when a corresponding input is used, since the electronic device returns to the region and corresponding content displayed on the screen before the input, so that the flexibility of the electronic device in displaying content can be improved.

It should be noted that the content display method provided in the embodiment of the present application may be executed by a content display apparatus, or a control module in the content display apparatus for executing the content display method. In the embodiment of the present application, the content display apparatus provided in the embodiment of the present application is described by taking the execution of the content display method by the content display apparatus as an example.

Figure 12:
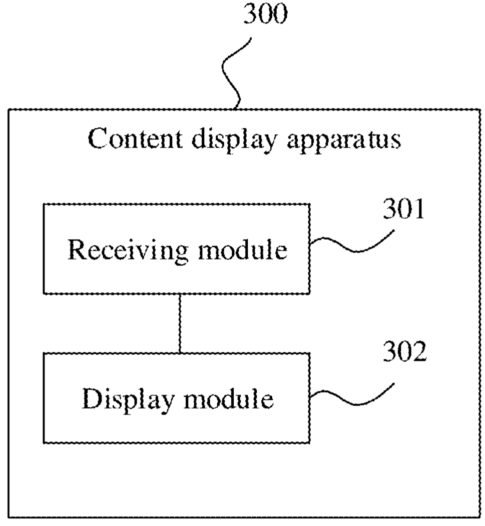
FIG. 12 is a schematic structural diagram of a content display device provided by an embodiment of the present application.

Referring to FIG. 12, an embodiment of the present application provides a content display apparatus 300. The content display apparatus may include: a receiving module 301 and a display module 302. The receiving module 301 may be configured to receive a first input by a user when the display module 302 displays content in a first object; and the display module 302 may be configured to: in response to the first input received by the receiving module 301, display M contents in M regions of the screen of an electronic device, where the M regions correspond to the M contents one-to-one, M is an integer greater than 1, each of the M contents includes at least one of the following: first content in the first object or at least one type of additional information associated with the first content in the first object; and at least part of content in different regions is different.

Optionally, the M contents include the first content and N types of additional information, and N is a positive integer. The display module 302 may be configured to sequentially display the M contents in the M regions according to a first priority order of the first content and the N types of additional information.

Optionally, when the first object is a document, the display module 302 can further be configured to display the first content and N types of additional information on the screen; the display module 302 is configured to split the first content and N types of additional information into M contents according to the first priority order and M first size ratios, and sequentially display the M contents in M regions, where each first size ratio is a ratio of a size of one of the M regions to a size of the screen, and each content includes the first content, or each content includes the first content and at least one of the N types of additional information.

Optionally, when the first object is a video file, the display module 302 includes a determining sub-module, a processing sub-module and a display sub-module. The display module 302 can further be configured to display second content on the screen, where the second content includes the first content, or the first content and first type of additional information; and the determining sub-module may be configured to determine M−1 first target regions from the M regions; the determining sub-module may be further configured to determine, according to M−1 second size ratios, the N types of additional information from P types of additional information arranged in a priority order, where the N types of additional information include the first type of additional information, P is an integer greater than or equal to N, and each second size ratio is a ratio of a size of a first target region to a size of the screen; and the processing sub-module is configured to split the first content and the N types of additional information determined by the determining sub-module into the M contents according to the M−1 second size ratios, a third size ratio, and the first priority order, where the third size ratio is a ratio of a size of a second target region to the size of the screen, and the second target region is a region in the M regions other than M−1 target regions; and the display sub-module may be configured to sequentially display, in the M regions, the M contents split by the processing sub-module.

Optionally, the apparatus may further include a processing module; the receiving module 301 may be further configured to receive a second input performed by the user on a first region in the M regions; the processing module may be configured to: in response to the second input received by the receiving module 301, split content in the first region into at least two first sub-contents according to a priority of the content in the first region, and divide the first region into at least two first sub-regions; the display module 303 is further configured to display one of the first sub-contents in each of the first sub-regions; and each first sub-content includes at least one of the following: the first content, or at least one type of additional information associated with the first content.

Optionally, the apparatus may also include a processing module; the receiving module 301 may be further configured to receive a third input performed by the user on multiple regions in the M regions; the display module 302 may be further configured to: in response to the third input received by the receiving module 301, display prompt information, where the prompt information includes multiple region identifiers, and each region identifier is used to indicate at least one region in the multiple regions; the receiving module 301 may be further configured to receive a fourth input performed by the user on a target region identifier among the multiple region identifiers displayed by the display module 302, where the target region identifier is used to indicate a second region; the processing module may be configured to: in response to the fourth input received by the receiving module 301, split content in the second region into at least two second sub-contents according to a priority of the content in the second region, and divide the second region into at least two second sub-regions; the display module 302 may be further configured to display one of the first sub-contents in each of the first sub-regions; where each first sub-content includes at least one of the following: the first content, or at least one type of additional information associated with the first content.

Optionally, the M regions include a third region and a fourth region, and the number of types of additional information included in the third region is greater than the number of types of additional information included in the fourth region. The receiving module 301 can further be configured to receive the user's fifth input. The display module 302 may be further configured to: in response to the fifth input received by the receiving module 301, in a case that feature information of the fifth input matches feature information of the first input, display, in the fourth region, part of the content in the third region, and cancel the display of the part of the content in the third region.

Optionally, the receiving module 301 can further be configured to receive a sixth input by the user; and the display module 302 is further configured to: in response to the sixth input received by the receiving module 301, in a case that an input position of the sixth input matches an input position of the first input and an input direction of the sixth input is different from an input direction of the first input, display the content in the first object in a display manner used before receiving the first input.

In the content display apparatus provided by the embodiment of the present application, when the content in the first object is displayed, the user can trigger, through the first input, the content display apparatus to display different contents in the first object in different regions. For example, the first content and at least part of additional information associated with the first content in the first object are displayed in different regions, or the additional information associated with the first content in the first object is displayed in different regions, which can improve the flexibility of the content display apparatus in displaying the content.

For a beneficial effect of each implementation in this embodiment, refer to a beneficial effect of a corresponding implementation in the foregoing method embodiment. To avoid repetition, details are not described herein again.

The content display apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle terminal, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine or a self-service machine. This is not specifically limited in the embodiments of the present application.

The content display apparatus in the embodiments of this application can be an apparatus with an operating system. The operating system may be an Android operating system, or may be an iOS operating system, or may be another possible operating system, which is not specifically limited in this embodiment of the present application.

The content display apparatus provided in this embodiment of the present application can implement each process in the method embodiments of FIG. 1. To avoid repetition, details are not described herein again.

Figure 13:
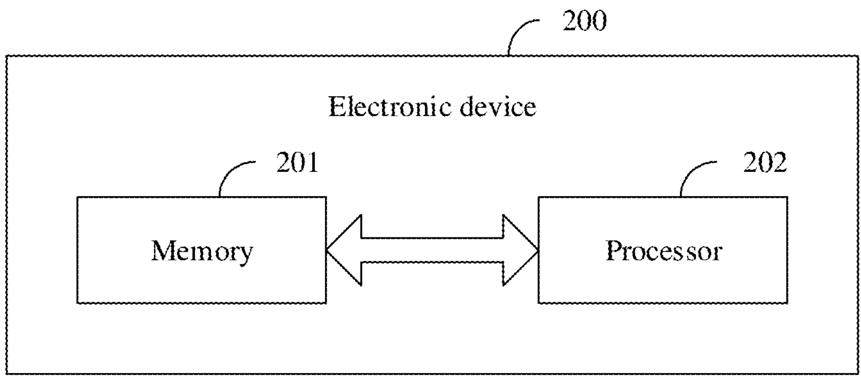
FIG. 13 is a schematic diagram of a structure of an electronic device provided by an embodiment of this application.

As shown in FIG. 13, the embodiments of the present application further provide an electronic device 200, including a processor 202, a memory 201, and a program or instruction stored in the memory 201 and executable on the processor 202, when the program or instruction is executed by the processor 202, each process of the content display method embodiment described above can be realized, and the same technical effect can be achieved. To avoid repetition, details are not repeated herein.

It should be noted that the electronic device in this embodiment of this application includes the foregoing mobile electronic device and the foregoing non-mobile electronic device.

Figure 14:
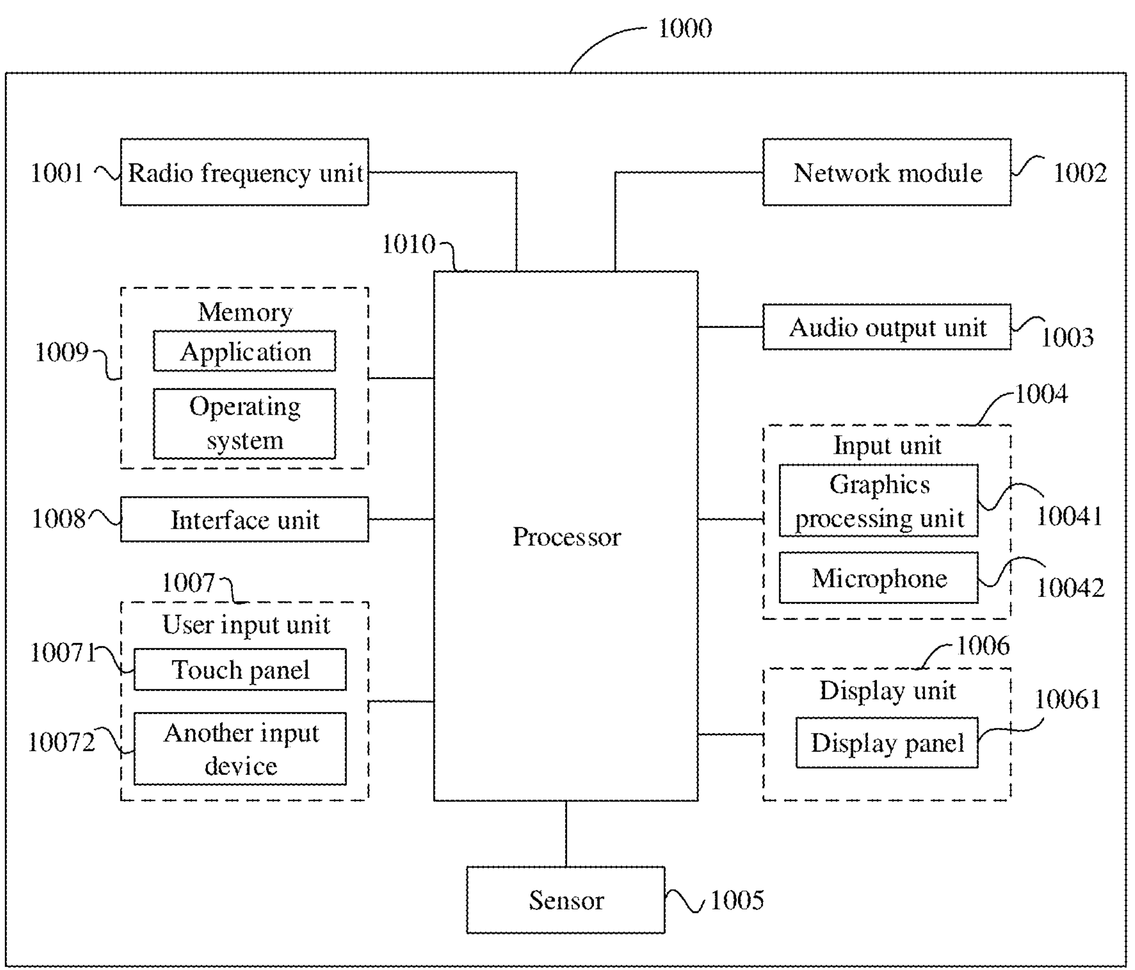
FIG. 14 is a schematic diagram of hardware of an electronic device provided by an embodiment of this application.

FIG. 14 is a schematic diagram of a hardware structure of an electronic device according to an embodiment of this application.

An electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (such as a battery) that supplies power to each component. The power supply may be logically connected to the processor 1010 by using a power supply management system, to implement functions such as charging and discharging management, and power consumption management by using the power supply management system. The structure of the electronic device shown in FIG. 14 does not constitute a limitation on the electronic device. The electronic device may include components more or fewer than those shown in the diagram, a combination of some components, or different component arrangements. Details are not described herein.

The user input unit 1007 may be configured to receive a first input by a user when the display module 1006 displays content in a first object; and the display module 1006 is configured to: in response to the first input received by the user input unit 1007, display M contents in M regions of the screen of an electronic device, where the M regions correspond to the M contents one-to-one, M is an integer greater than 1, each of the M contents includes at least one of the following: first content in the first object or at least one type of additional information associated with the first content in the first object; and at least part of content in different regions is different.

In the electronic device provided by the embodiment of the present application, when the content in the first object is displayed, the user can trigger, through the first input, the electronic device to display different contents in the first object in different regions. For example, the first content and at least part of additional information associated with the first content in the first object are displayed in different regions, or the additional information associated with the first content in the first object is displayed in different regions, which can improve the flexibility of the electronic device in displaying the content.

For a beneficial effect of each implementation in this embodiment, refer to a beneficial effect of a corresponding implementation in the foregoing method embodiment. To avoid repetition, details are not described herein again.

It should be understood that in the embodiments of this application, the input unit 1004 may include a graphics processing unit (GPU) 10041 and a microphone 10042, and the graphics processing unit 10041 processes image data of a still picture or video obtained by an image capture apparatus (such as a camera) in a video capture mode or an image capture mode. The display unit 1006 may include a display panel 10061. Optionally, the display panel 10061 may be configured in a form such as a liquid crystal display or an organic light-emitting diode. The user input unit 1007 includes a touch panel 10071 and another input device

10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application program and an operating system. An application processor and a modem processor may be integrated into the processor 1010, the application processor mainly processes an operating system, a user interface, an application program, and the like, and the modem processor mainly processes wireless communication. It can be understood that, the above modem processor may not be integrated into the processor 1010.

An embodiment of the present application further provides a non-transitory readable storage medium. The non-transitory readable storage medium stores a program or an instruction, and when the program or the instruction is executed by a processor, the various processes of the foregoing content display method embodiment is performed and the same technical effects can be achieved. To avoid repetition, details are not described herein again.

The processor is the processor in the electronic device in the foregoing embodiment. The non-transitory readable storage medium includes a non-transitory computer-readable storage medium, such as a computer read-only memory (ROM), a random access memory (RAM), a magnetic disk, an optical disc, or the like. An embodiment of the present application further provides a chip, the chip includes a processor and a communication interface, the communication interface is coupled to the processor, and the processor is configured to run programs or instructions to implement each process of the embodiment of the foregoing content display method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the terms “comprise”, “include”, and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. An element limited by “includes a . . . ” does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a computer software product. The computer software product is stored in a non-transitory storage medium (for example, a ROM/RAM, a magnetic disk, or a compact disc), and includes multiple instructions for instructing a terminal (which may be a mobile phone, a computer, a server, a network device, or the like) to perform the method described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A content display method, comprising:

receiving a first input by a user in a case of displaying a content in a first object; and in response to the first input, displaying M contents in M regions of a screen of an electronic device, wherein the M regions correspond to the M contents one-to-one, M is an integer greater than 1, each of the M contents comprises at least one of the following: a first content in the first object or at least one type of additional information associated with the first content in the first object; and at least part of content in different regions is different; wherein after the displaying the M contents in the M regions of the screen of the electronic device, the method further comprises:

receiving a third input by the user on multiple regions in the M regions;

in response to the third input, displaying prompt information, wherein the prompt information comprises multiple region identifiers, and each region identifier is used to indicate at least one region in the multiple regions;

receiving a fourth input by the user on a target region identifier among the multiple region identifiers, wherein the target region identifier is used to indicate a second region; and in response to the fourth input, splitting a content in the second region into at least two second sub-contents according to a priority of the content in the second region, dividing the second region into at least two second sub-regions, and displaying one of the second sub-contents in each of the second sub-regions; wherein each second sub-content comprises at least one of the following: the first content, or at least one type of additional information associated with the first content.

2. The method according to claim 1, wherein the M contents comprise the first content and N types of additional information, and N is a positive integer; and the displaying the M contents in the M regions of the screen of the electronic device comprises:

sequentially displaying the M contents in the M regions according to a first priority order of the first content and the N types of additional information.

3. The method according to claim 2, wherein in a case that the first object is a document, before the receiving the first input by the user, the method further comprises:

displaying the first content and the N types of additional information on the screen;

the sequentially displaying the M contents in the M regions according to the first priority order of the first content and the N types of additional information comprises:

splitting the first content and the N types of additional information into the M contents according to the first priority order and M first size ratios, and sequentially displaying the M contents in the M regions; wherein each first size ratio is a ratio of a size of one of the M regions to a size of the screen, and each content comprises the first content, or each content comprises the first content and at least one of the N types of additional information.

4. The method according to claim 2, wherein in a case that the first object is a video file, before the receiving the first input by the user, the method further comprises:

displaying a second content on the screen, wherein the second content comprises the first content, or the first content and first type of additional information; and the sequentially displaying the M contents in the M regions according to the first priority order of the first content and the N types of additional information comprises:

determining M−1 first target regions from the M regions;

determining, according to M−1 second size ratios, the N types of additional information from P types of additional information arranged in a priority order, wherein P is an integer greater than or equal to N, and each second size ratio is a ratio of a size of a first target region to a size of the screen; and splitting the first content and the N types of additional information into the M contents according to the M−1 second size ratios, a third size ratio, and the first priority order, and sequentially displaying the M contents in the M regions, wherein the third size ratio is a ratio of a size of a second target region to the size of the screen, and the second target region is a region in the M regions other than M−1 target regions.

5. The method according to claim 1, wherein after the displaying the M contents in the M regions of the screen of the electronic device, the method further comprises:

receiving a second input by the user on a first region in the M regions; and in response to the second input, splitting a content in the first region into at least two first sub-contents according to a priority of the content in the first region, dividing the first region into at least two first sub-regions, and displaying one of the first sub-contents in each of the first sub-regions; wherein each first sub-content comprises at least one of the following: the first content, or at least one type of additional information associated with the first content.

6. The method according to claim 1, wherein the M regions comprise a third region and a fourth region, and a number of types of additional information comprised in the third region is greater than a number of types of additional information comprised in the fourth region;

after the displaying the M contents in the M regions of the screen of the electronic device, the method further comprises:

receiving a fifth input by the user; and in response to the fifth input, in a case that feature information of the fifth input matches feature information of the first input, displaying, in the fourth region, part of a content in the third region, and canceling the display of the part of the content in the third region.

7. The method according to claim 1, wherein after the displaying the M contents in the M regions of the screen of the electronic device, the method further comprises:

receiving a sixth input by the user; and in response to the sixth input, in a case that an input position of the sixth input matches an input position of the first input and an input direction of the sixth input is different from an input direction of the first input, displaying the content in the first object in a display manner used before receiving the first input.

8. An electronic device, comprising a processor, a memory, and a program or instruction stored in the memory and executable on the processor, wherein the program or instruction, when executed by the processor, causes the electronic device to perform:

receiving a first input by a user in a case of displaying a content in a first object; and in response to the first input, displaying M contents in M regions of a screen of the electronic device, wherein the M regions correspond to the M contents one-to-one, M is an integer greater than 1, each of the M contents comprises at least one of the following: a first content in the first object or at least one type of additional information associated with the first content in the first object; and at least part of content in different regions is different;

wherein the program or instruction, when executed by the processor, causes the electronic device to further perform:

receiving a third input by the user on multiple regions in the M regions;

in response to the third input, displaying prompt information, wherein the prompt information comprises multiple region identifiers, and each region identifier is used to indicate at least one region in the multiple regions;

receiving a fourth input by the user on a target region identifier among the multiple region identifiers, wherein the target region identifier is used to indicate a second region; and in response to the fourth input, splitting a content in the second region into at least two second sub-contents according to a priority of the content in the second region, dividing the second region into at least two second sub-regions, and displaying one of the second sub-contents in each of the second sub-regions; wherein each second sub-content comprises at least one of the following: the first content, or at least one type of additional information associated with the first content.

9. The electronic device according to claim 8, wherein the M contents comprise the first content and N types of additional information, and N is a positive integer; and the program or instruction, when executed by the processor, causes the electronic device to perform:

sequentially displaying the M contents in the M regions according to a first priority order of the first content and the N types of additional information.

10. The electronic device according to claim 9, wherein in a case that the first object is a document, the program or instruction, when executed by the processor, causes the electronic device to further perform:

displaying the first content and the N types of additional information on the screen; and the program or instruction, when executed by the processor, causes the electronic device to perform:

splitting the first content and the N types of additional information into the M contents according to the first priority order and M first size ratios, and sequentially displaying the M contents in the M regions; wherein each first size ratio is a ratio of a size of one of the M regions to a size of the screen, and each content comprises the first content, or each content comprises the first content and at least one of the N types of additional information.

11. The electronic device according to claim 9, wherein in a case that the first object is a video file, the program or instruction, when executed by the processor, causes the electronic device to further perform:

displaying a second content on the screen, wherein the second content comprises the first content, or the first content and first type of additional information; and the program or instruction, when executed by the processor, causes the electronic device to perform:

determining M−1 first target regions from the M regions;

determining, according to M−1 second size ratios, the N types of additional information from P types of additional information arranged in a priority order, wherein P is an integer greater than or equal to N, and each second size ratio is a ratio of a size of a first target region to a size of the screen; and splitting the first content and the N types of additional information into the M contents according to the M−1 second size ratios, a third size ratio, and the first priority order, and sequentially displaying the M contents in the M regions, wherein the third size ratio is a ratio of a size of a second target region to the size of the screen, and the second target region is a region in the M regions other than M−1 target regions.

12. The electronic device according to claim 8, wherein the program or instruction, when executed by the processor, causes the electronic device to further perform:

receiving a second input by the user on a first region in the M regions; and in response to the second input, splitting a content in the first region into at least two first sub-contents according to a priority of the content in the first region, dividing the first region into at least two first sub-regions, and displaying one of the first sub-contents in each of the first sub-regions; wherein each first sub-content comprises at least one of the following: the first content, or at least one type of additional information associated with the first content.

13. The electronic device according to claim 8, wherein the M regions comprise a third region and a fourth region, and a number of types of additional information comprised in the third region is greater than a number of types of additional information comprised in the fourth region; and the program or instruction, when executed by the processor, causes the electronic device to further perform:

receiving a fifth input by the user; and in response to the fifth input, in a case that feature information of the fifth input matches feature information of the first input, displaying, in the fourth region, part of a content in the third region, and canceling the display of the part of the content in the third region.

14. The electronic device according to claim 8, wherein the program or instruction, when executed by the processor, causes the electronic device to further perform:

receiving a sixth input by the user; and in response to the sixth input, in a case that an input position of the sixth input matches an input position of the first input and an input direction of the sixth input is different from an input direction of the first input, displaying the content in the first object in a display manner used before receiving the first input.

15. A non-transitory readable storage medium, storing a program or an instruction, wherein the program or instruction, when executed by a processor of an electronic device, causes the electronic device to perform:

receiving a first input by a user in a case of displaying a content in a first object; and in response to the first input, displaying M contents in M regions of a screen of the electronic device, wherein the M regions correspond to the M contents one-to-one, M is an integer greater than 1, each of the M contents comprises at least one of the following: a first content in the first object or at least one type of additional information associated with the first content in the first object; and at least part of content in different regions is different;

wherein the program or instruction, when executed by the processor, causes the electronic device to further perform:

receiving a third input by the user on multiple regions in the M regions;

in response to the third input, displaying prompt information, wherein the prompt information comprises multiple region identifiers, and each region identifier is used to indicate at least one region in the multiple regions;

receiving a fourth input by the user on a target region identifier among the multiple region identifiers, wherein the target region identifier is used to indicate a second region; and in response to the fourth input, splitting a content in the second region into at least two second sub-contents according to a priority of the content in the second region, dividing the second region into at least two second sub-regions, and displaying one of the second sub-contents in each of the second sub-regions; wherein each second sub-content comprises at least one of the following: the first content, or at least one type of additional information associated with the first content.

16. The non-transitory readable storage medium according to claim 15, wherein the M contents comprise the first content and N types of additional information, and N is a positive integer; and the program or instruction, when executed by the processor, causes the electronic device to perform:

sequentially displaying the M contents in the M regions according to a first priority order of the first content and the N types of additional information.

17. The non-transitory readable storage medium according to claim 16, wherein in a case that the first object is a document, the program or instruction, when executed by the processor, causes the electronic device to further perform:

displaying the first content and the N types of additional information on the screen; and the program or instruction, when executed by the processor, causes the electronic device to perform:

splitting the first content and the N types of additional information into the M contents according to the first priority order and M first size ratios, and sequentially displaying the M contents in the M regions; wherein each first size ratio is a ratio of a size of one of the M regions to a size of the screen, and each content comprises the first content, or each content comprises the first content and at least one of the N types of additional information.

18. The non-transitory readable storage medium according to claim 16, wherein in a case that the first object is a video file, the program or instruction, when executed by the processor, causes the electronic device to further perform:

displaying a second content on the screen, wherein the second content comprises the first content, or the first content and first type of additional information; and the program or instruction, when executed by the processor, causes the electronic device to perform:

determining M−1 first target regions from the M regions;

determining, according to M−1 second size ratios, the N types of additional information from P types of additional information arranged in a priority order, wherein P is an integer greater than or equal to N, and each second size ratio is a ratio of a size of a first target region to a size of the screen; and splitting the first content and the N types of additional information into the M contents according to the M−1 second size ratios, a third size ratio, and the first priority order, and sequentially displaying the M contents in the M regions, wherein the third size ratio is a ratio of a size of a second target region to the size of the screen, and the second target region is a region in the M regions other than M−1 target regions.

19. The non-transitory readable storage medium according to claim 15, wherein the program or instruction, when executed by the processor, causes the electronic device to further perform:

receiving a second input by the user on a first region in the M regions; and in response to the second input, splitting a content in the first region into at least two first sub-contents according to a priority of the content in the first region, dividing the first region into at least two first sub-regions, and displaying one of the first sub-contents in each of the first sub-regions; wherein each first sub-content comprises at least one of the following: the first content, or at least one type of additional information associated with the first content.

20. The non-transitory readable storage medium according to claim 15, wherein the M regions comprise a third region and a fourth region, and a number of types of additional information comprised in the third region is greater than a number of types of additional information comprised in the fourth region; and the program or instruction, when executed by the processor, causes the electronic device to further perform:

receiving a fifth input by the user; and in response to the fifth input, in a case that feature information of the fifth input matches feature information of the first input, displaying, in the fourth region, part of a content in the third region, and canceling the display of the part of the content in the third region.

* * * * *